(12) United States Patent
Kudo

(10) Patent No.: US 8,874,911 B2
(45) Date of Patent: Oct. 28, 2014

(54) TERMINAL DEVICE, SYSTEM, CONNECTION MANAGEMENT SERVER, AND COMPUTER READABLE MEDIUM

(75) Inventor: Yasuhiro Kudo, Ichinomiya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 862 days.

(21) Appl. No.: 12/713,240

(22) Filed: Feb. 26, 2010

(65) Prior Publication Data

US 2010/0228978 A1 Sep. 9, 2010

(30) Foreign Application Priority Data

Mar. 6, 2009 (JP) ................................. 2009-054010

(51) Int. Cl.
| H04L 9/32 | (2006.01) |
| H04L 9/00 | (2006.01) |
| G06F 21/00 | (2013.01) |
| H04L 29/06 | (2006.01) |
| H04L 29/12 | (2006.01) |

(52) U.S. Cl.
CPC .......... *H04L 65/1069* (2013.01); *H04L 61/2578* (2013.01); *H04L 61/2546* (2013.01); *H04L 29/12452* (2013.01); *H04L 29/12528* (2013.01); *H04L 65/1006* (2013.01); *H04L 63/08* (2013.01); *H04L 63/06* (2013.01); *H04L 61/2564* (2013.01); *H04L 29/125* (2013.01); *H04L 61/2575* (2013.01)
USPC ................................. 713/168; 380/277; 726/3

(58) Field of Classification Search
CPC ..... H04L 63/06; H04L 63/08; H04L 65/1006; H04L 65/1069
USPC ................................. 713/168; 380/277; 726/3
See application file for complete search history.

(56) References Cited

U.S. PATENT DOCUMENTS

| 7,561,575 B2 * | 7/2009 | Biswas et al. ................. 370/392 |
| 2004/0139225 A1 | 7/2004 | Takahashi |

(Continued)

FOREIGN PATENT DOCUMENTS

| CN | 101123582 A | 2/2008 |
| DE | 10 2007 001 408 A1 | 7/2008 |

(Continued)

OTHER PUBLICATIONS

NUTSS: A SIP-based Approach to UDP and TCP Network Connectivity, Saikat Guha, et al. 2004.*

(Continued)

*Primary Examiner* — Saleh Najjar
*Assistant Examiner* — Oleg Korsak
(74) *Attorney, Agent, or Firm* — Banner & Witcoff, Ltd.

(57) ABSTRACT

A second terminal device is used in a system including a connection management server, a first terminal device, and the second terminal device. The second terminal device includes: a local address obtaining unit configured to obtain a first local IP address and first authentication information of the first terminal device from the connection management server, if a first global IP address matches a second global IP address; a determination unit configured to determine, by using of the obtained first authentication information, whether a first particular terminal device with which the second terminal device can communicate by use of the first local IP address is the first terminal device; and a target data communication unit configured to communicate first data with the first terminal device by using the first local IP address, if the first particular terminal device is determined to be the first terminal device.

11 Claims, 12 Drawing Sheets

(56) References Cited

U.S. PATENT DOCUMENTS

| | | |
|---|---|---|
| 2004/0196506 A1 | 10/2004 | Izumi et al. |
| 2007/0078986 A1* | 4/2007 | Ethier et al. .................. 709/227 |
| 2007/0097999 A1 | 5/2007 | Yan |
| 2009/0113203 A1* | 4/2009 | Tsuge et al. .................. 713/151 |

FOREIGN PATENT DOCUMENTS

| | | |
|---|---|---|
| EP | 1 760 986 A1 | 3/2007 |
| JP | 2003258836 A | 9/2003 |
| JP | 2004-173240 A | 6/2004 |
| JP | 2004-304711 | 10/2004 |
| JP | 2006-140903 | 6/2006 |
| JP | 2008-016932 | 1/2008 |
| JP | 2008-099168 | 4/2008 |
| JP | 2008-258917 A | 10/2008 |
| JP | 2010-011120 A | 1/2010 |
| WO | 2007025429 A1 | 3/2007 |
| WO | 2008/083919 A1 | 7/2008 |

OTHER PUBLICATIONS

J. Rosenberg, draft-ietf-mmusic-ice-04, Feb. 21, 2005.*

Extended EP Search Report dtd Jul. 30, 2010, EP Appln. 10250386.9-2413.

Aoun, C. et al., "Identifying intra-realm calls and Avoiding media tromboning; draft-aoun-midcom-intrarealmcalls-00.txt", IETF Draft, Feb. 25, 2002, XP015000106, pp. 1-9.

Rosenburg et al., "SIP: Session Initiation Protocol; RFC 3261", Internet Engineering Task Force (IETF), Jun. 2002, pp. 195-199; XP015009039.

EP Office Action dated Jul. 4, 2011, corresponding EP Application No. 10 250 386.9.

JP Office Action dtd Mar. 1, 2011, JP Appln. 2009-054010, English translation.

CN Office Action mailed Jul. 4, 2012, CN Appln. 201010129655.0, English translation.

* cited by examiner

TERMINAL DEVICE, SYSTEM, CONNECTION MANAGEMENT SERVER, AND COMPUTER READABLE MEDIUM

CROSS-REFERENCE TO RELATED APPLICATIONS

This application claims priority from Japanese Patent Application No. 2009-054010 filed on Mar. 6, 2009, the entire contents of which are incorporated herein by reference.

TECHNICAL FIELD

The present invention relates to a terminal device configured to communicate with another terminal device.

BACKGROUND

An NAT (Network Address Translation) router has widely been known. The NAT router is interposed between the Internet and a local network. The NAT router performs processing for translating an address between a global address (a global IP address and a port number) and a local address (a local IP address and a port number). For example, in order to perform a data communication between a first terminal device belonging to a first local network and a second terminal device belonging to a second local network, a global address of the first terminal device and a global address of the second terminal device are usually used. In this case, a first NAT router assigned to the first local network translates an address of data communicated between the first terminal device and the Internet (i.e., the second terminal device). A second NAT router assigned to the second local network also translates an address of data communicated between the second terminal device and the Internet (i.e., the first terminal device).

SUMMARY

Processing load on the NAT router become larger as the number of terminal devices belonging to the local network is increased. The present patent specification provides a technique enabling reduced processing load on an NAT router.

According to a first aspect of the invention, there is provided a second terminal device used in a system that comprises a connection management server, a first terminal device, and the second terminal device, said second terminal device comprising: a local address obtaining unit configured to obtain a first local IP address and first authentication information of the first terminal device from the connection management server in which the first local IP address and the first authentication information are registered, if a first global IP address of the first terminal device matches a second global IP address of the second terminal device; a determination unit configured to determine, by using of the obtained first authentication information, whether a first particular terminal device with which the second terminal device can communicate by use of the first local IP address is the first terminal device; and a target data communication unit configured to communicate first data with the first terminal device by use of the first local IP address, if the determination unit determines that the first particular terminal device is the first terminal device.

According to a second aspect of the invention, there is provided a system comprising a connection management server, a first terminal device, and the second terminal device according to the first aspect.

According to a third aspect of the invention, there is provided a connection management server used in a system that comprises the connection management server, a first terminal device and a second terminal device, said connection management server comprising: a server-side storage control unit configured to hold a first global IP address, a first local IP address, and first authentication information of the first terminal device in association with one another in a server-side storage unit; a server-side receiving unit configured to receive a connection request that is transmitted by the second terminal device to the first terminal device as a destination and that includes a second global IP address of the second terminal device; a server-side determination unit configured to determine whether the first global IP address of the first terminal device held in the server-side storage unit matches the second global IP address of the second terminal device included in the connection request; and a server-side transmission unit configured to transmit the first local IP address and the first authentication information of the first terminal device held in the server-side storage unit to the second terminal device if the server-side determination unit determines that the first global IP address matches the second global IP address.

According to a fourth aspect of the invention, there is provided a second terminal device used in a system that comprises a connection management server, a first terminal device, and the second terminal device, said second terminal device comprising: a local address obtaining unit configured to obtain a first local IP address from the connection management server in which the first local IP address of the first terminal device is registered; a first target data communication unit configured to communicate first data with the first terminal device by use of the obtained first local IP address if a first global IP address of the first terminal device matches a second global IP address of the second terminal device; and a second target data communication unit configured to communicate second data with the first terminal device by use of the first global IP address of the first terminal device if the first global IP address of the first terminal device does not match the second global IP address of the second terminal device.

DESCRIPTION

Figure 1:
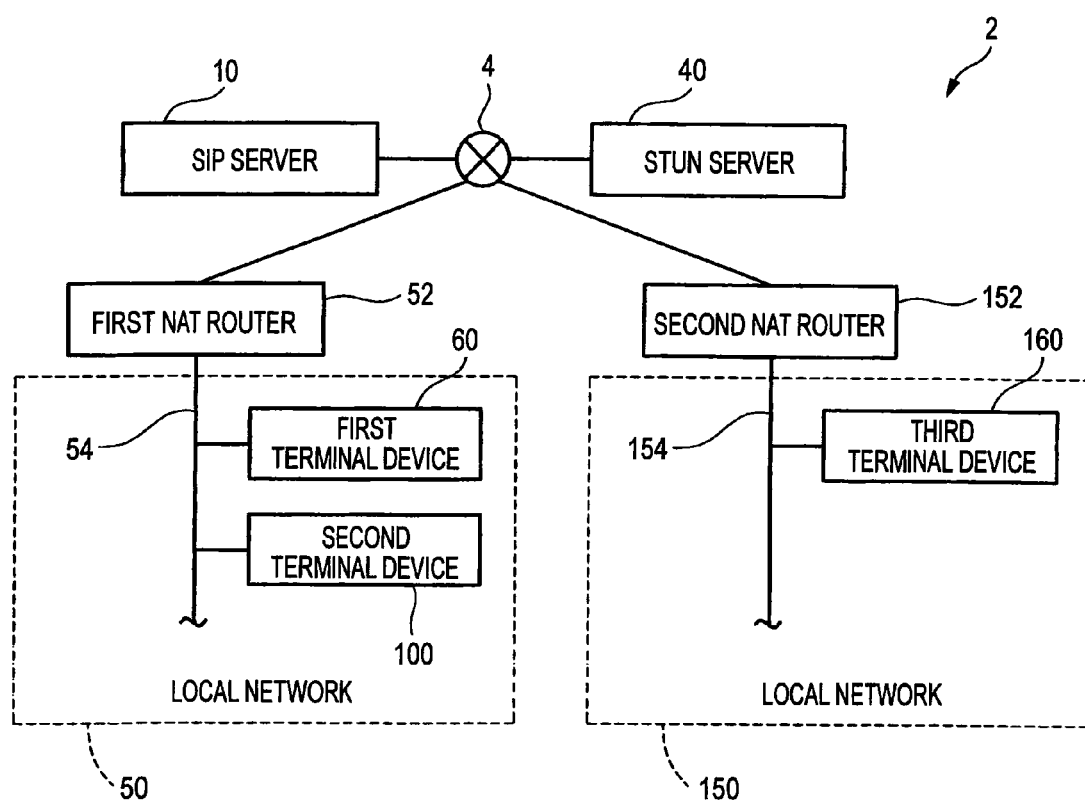
FIG. 1 shows a phone network system according to an embodiment of the invention.

A global IP address of one of a pair of terminal devices may match a global IP address of the other terminal device. In this case, the pair of terminal devices will probably belong to the same local network. The pair of terminal devices belonging to the same network can perform a data communication of target data (in other words, data to be transmitted) by use of global addresses, and also can perform the data communication by use of local addresses. In the former case, the NAT router must perform address translation processing. Meanwhile, in the latter case, address translation processing is not required. Hence, the target data can be transmitted without involvement of the NAT router. In the present embodiment, when a pair of terminal devices belongs to the same local network, the processing load on the NAT router is reduced by implementing a target data transmission without involvement of the NAT router.

One of techniques described in connection with the embodiment related to a second terminal device used in a system including a connection management server, a first terminal device, and the second terminal device. The second terminal device includes a local address obtaining unit, a determination unit, and a target data communication unit. If a first global IP address of the first terminal device matches a second global IP address of the second terminal device, the local address obtaining unit obtains a first local IP address and first authentication information of the first terminal device from a connection management server in which the first local IP address and the first authentication information are registered. Whether to match the first global IP address and the second global IP address may be determined by the second terminal device or by another device (e.g., the connection management server).

By using of the first authentication information already obtained, the determination unit determines whether a first particular terminal device with which the second terminal device can communicate by use of the first local IP address is the target first terminal device. If the first particular terminal device is determined to be the target first terminal device by the determination unit, the target data communication unit is configured to communicate target first data with the first terminal device by use of the first local IP address. As used herein, the term "communicate (communication)" may include reception and/or transmission operation. The phrase "to communicate target first data with the first terminal device by use of the first local IP address" can also be translated into another phrase "to establish a communication session between the first terminal device and the second terminal device by use of a first local IP address." The phrase "to establish a communication session" can also be translated into another phrase "to communicate (transmit and/or receive) at least one command required to communicate (transmit and/or receive) the target data."

If the first global IP address of the first terminal device matches the second global IP address of the second terminal device, the second terminal device obtains the first local IP address and first authentication information of the first terminal device from the connection management server by the above-described configuration. Even when the second terminal device performs a communication by use of the first local IP address already obtained, a communication with the target first terminal device may fail. For example, although the first local IP address was assigned to the first terminal device in the past and registered in the connection management server, the first terminal device may currently be assigned another local IP address. In light of such a possibility, the second terminal device determines, by use of first authentication information, whether it is able to actually communicate with the first terminal device by use of the first local IP address. If an affirmative determination result is obtained, the second terminal device communicates first data with the first terminal device by use of the first local IP address. When the first terminal device and the second terminal device belong to the same local network, the technique enables the second terminal device to communicate the target data (the first data) with the first terminal device without involvement of an NAT router. Consequently, processing load on the NAT router can be reduced.

The second terminal device may further include a global address obtaining unit configured to obtain a set of the first global IP address and a port number of the first terminal device. In this case, if the first particular terminal device is determined not to be the target first terminal device by the determination unit, the target data communication unit communicates second data with the first terminal device by use of the set of the first global IP address and the port number. Therefore, when a communication cannot be performed with the first terminal device by use of the first local IP address, the configuration enables a communication with the first terminal device by use of the set of the first global IP address and the port number of the first terminal device.

The second terminal device may further include a first challenge data communication unit configured to transmit first challenge data to the first particular terminal device and to receive first response data in response to the first challenge data. The first response data is generated by encrypting the first challenge data and transmitted by the first particular terminal device. The first authentication information may include a first public key of the first terminal device. In this case, the determination unit decrypts the first response data by means of the first public key, thereby generating first decrypted data. If the first decrypted data matches the first challenge data, the determination unit determines the particular first terminal device is the target first terminal device. Therefore, the configuration makes it possible to reliably determine whether the particular first terminal device is the target first terminal device.

If the first response data are not received by the first challenge data communication unit, the determination unit may determine that the particular first terminal device is not the target first terminal device.

The second terminal device may further include a storage control unit configured to hold the first local IP address in a storage unit after completion of the communication of the first data. The phrase "to hold a first local IP address in a storage unit after completion of the communication of the first data" means that a storage unit is caused to hold the first local IP address, at least, in a period subsequent to completion of the communication of the first data. Accordingly, the phrase may imply that the first local IP address may be continually held during a period from before completion of a first data communication to the period subsequent to the completion thereof. The phrase can also be translated into another phrase "to cause the storage unit to hold the first local IP address immediately after completion of the communication of the first data." The phrase "after completion of the communication of the first data" may be translated into another phrase "after disconnection of a communication session for communicating the first data." When third data should be communicated with the first terminal device after the completion of the communication of the first data, the target data communication unit may communicate the third data with the first terminal device by using again the first local IP address held in the storage unit. The configuration makes it possible for the second terminal device to communicate the target data (the third data) with the first terminal device without involvement of the NAT router. The storage control unit may hold the first local IP address, for example, until elapse of a predetermined period after the completion of the communication of the first data or until initiation of another data communication with a terminal device other than the first terminal device after the completion of the communication of the first data.

For example, the first terminal device may be assigned another local IP address in place of the first local IP address after the completion of the communication of the first data. The following configuration may also be adopted in light of such a possibility. Specifically, the storage control unit may further hold the first authentication information in the storage unit. When the communication of the third data should be performed with the first terminal device after the completion of the communication of the first data, the determination unit may determine whether a particular second terminal device with which the second terminal device can communicate by use of the first local IP address held in the storage unit is the target first terminal device, by use of the first authentication information held in the storage unit. If the determination unit determines that the particular second terminal device is the target first terminal device, the target data communication unit may communicate the third data with the first terminal device by using again the first local IP address held in the storage unit. The configuration makes it possible for the second terminal device to determine, when the third data should be communicated, whether it is able to actually perform the communication with the first terminal device by use of the first local IP address, by utilization of the first authentication information. If an affirmative determination result is obtained, the communication of the third data can be established between the first terminal device and the second terminal device without involvement of an NAT router.

The storage control unit may continually hold the first local IP address in the storage unit for a predetermined period of time. For example, the storage control unit may delete the first local IP address after elapse of the predetermined period. When the third data communication should be communicated with the first terminal device, the target data communication unit may communicate the third data with the first terminal device by using again the first local IP address held in the storage unit if the first local IP address is held in the storage unit.

There can be a case in which the data communication should again be performed between the first terminal device and the second terminal device in response to a request from the first terminal device after the completion of the communication of the first data. Even in this case, processing load on the NAT router can further be reduced, so long as the communication is performed between the first terminal device and the second terminal device by use of a local IP address. In order to implement operation, the terminal device may further include a configuration to be described below. Specifically, the second terminal device may further include a public key transmission unit and a second challenge data communication unit. If the particular first terminal device is determined to be the target first terminal device by the determination unit, the public key transmission unit may transmit a second public key of the second terminal device to the first terminal device. The second challenge data communication unit may be configured to: receive second challenge data transmitted by the first terminal device to the second local IP address of the second terminal device as a destination; encrypt the second challenge data using a secret key of the second terminal device so as to generate second response data; and transmit the second response data to the first terminal device. If second decrypted data matches the second challenge data, the target data communication unit may communicate fourth data with the first terminal device by use of the second local IP address. The second decrypted data is data generated by the first terminal device by decrypting the second response data by use of the second public key. The configuration makes it possible for the first terminal device to determine whether it is able to actually communicate with the second terminal device by use of the second local IP address when the fourth data should be communicated, by use of the second public key. If an affirmative determination result is obtained, the fourth data can be communicated between the first terminal device and the second terminal device without involvement of the NAT router.

A system including the connection management server, the first terminal device, and the second terminal device is also novel and useful. A control method and a computer program for implementing the second terminal device are also novel and useful.

The connection management server is also novel and useful. The connection management server can be expressed as follows. The connection management server includes a server-side storage control unit, a server-side receiving unit, a server-side determination unit, and a server-side transmission unit. The server-side storage control unit is configured to hold a first global IP address, a first local IP address, and first authentication information of the first terminal device in association with one another in a server-side storage unit. The server-side receiving unit receives a connection request that is transmitted by the second terminal device to the first terminal device as a destination and that includes a second global IP address of the second terminal device. The server-side determination unit is configured to determine whether the first global IP address of the first terminal device held in the server-side storage unit matches the second global IP address of the second terminal device included in the connection request. If the server-side determination unit determines that the first global IP address matches the second global IP address, the server-side transmission unit transmits the first local IP address and the first authentication information of the first terminal device held in the server-side storage unit to the second terminal device. Use of the connection management server enables implementation of the system.

The server-side storage control unit may hold the second global IP address of the second terminal device in the server-side storage unit in advance. In this case, the second global IP address of the second terminal device included in the connection request transmitted from the second terminal device should match the second global IP address of the second terminal device held in the server-side storage unit. Accordingly, the server-side determination unit may determine whether the first global IP address of the first terminal device matches the second global IP address of the second terminal device held in the server-side storage unit. Even in this case, this determination is substantially equivalent to "a determination whether the first global IP address of the first terminal device held in the server-side storage unit matches the second global IP address of the second terminal device included in the connection request."

The connection management server may further include a server-side transfer unit configured, if the server-side determination unit determines that the first global IP address does not match the second global IP address, to transfer the connection request to the first terminal device. The configuration makes it possible for the first terminal device and the second terminal device to communicate the target data by use of the global IP addresses.

The technique described in connection with the present specification may also be expressed as a second terminal device that will be described below. The second terminal device has a technical characteristic such that target data are communicated without involvement of an NAT router when a first terminal device and the second terminal device belong to the same local network. The second terminal device includes a local address obtaining unit, a first target data communication unit, and a second target data communication unit. The local address obtaining unit is configured to obtain a first local IP address from the connection management server in which the first local IP address of the first terminal device is registered. If the first global IP address of the first terminal device matches the second global IP address of the second terminal device, the first target data communication unit communicates target first data with the first terminal device by use of the first local IP address already obtained. If the first global IP address of the first terminal device does not match the second global IP address of the second terminal device, the second target data communication unit communicates second data with the first terminal device by use of the first global IP address of the first terminal device. A control method and a computer program for implementing the second terminal device are also novel and useful.

Further techniques described in connection with embodiments provided below are mentioned hereunder.

(1) If the first global IP address of the first terminal device does not match the second global IP address of the second terminal device, the target data communication unit can communicate with the first terminal device by use of the set of the first global IP address and the port number of the first terminal device.

(2) If the determination unit determines that the second particular terminal device is not the target first terminal device, the target data communication unit may communicate the third data with the first terminal device by use of the set of the first global IP address and the port number of the first terminal device.

(3) If the first local IP address is not held in the storage unit when the third data should be communicated with the first terminal device, the target data communication unit may communicate the third data with the first terminal device by use of the set of the first global IP address and the port number of the first terminal device.

(4) The server-side storage control unit may hold identification information (e.g., SIPURI), a global IP address, a local IP address, and authentication information of each of a plurality of terminal devices in the server-side storage unit. If the connection request including a global IP address of a source and identification information about a destination is received, the server-side determination unit may determine whether the global IP address of the source included in the connection request matches the global IP address associated with the identification information about the destination included in the connection request.

(System Configuration)

An embodiment is now described by reference to the drawings. As shown in FIG. 1, a phone network system 2 has the Internet 4, an SIP (Session Initiation Protocol) server 10, a STUN (Simple Traversal of UDP through NATs) server 40, a plurality of local networks 50 and 150, and the like. The SIP server 10, the STUN server 40, the plurality of local networks 50 and 150, and the like, are connected to the Internet 4.

(Configuration of the SIP Server 10)

The SIP server 10 includes a control unit 12, a network interface 14, a program memory area 16, and a registration data memory area 18. The control unit 12 performs processing according to a program stored in the program memory area 16. The network interface 14 is connected to the Internet 4. The program memory area 16 stores a program to be executed by the control unit 12. The program memory area 16 may also store a program installed from a program storage medium or a program downloaded from the Internet 4, or the like.

The registration data memory area 18 stores registration data 20 and 22. The registration data 20 are data pertaining to a first terminal device 60, and the registration data 22 are data pertaining to the second terminal device 100. Each set of registration data 20 and 22 includes a SIPURI 30 and a global IP+port 32 which are associated with each other. The SIPURI 30 is a unique URI assigned to each terminal device utilizing an SIP. In the present embodiment, a first terminal device 60 is assigned a SIPURI "sip:t1@server.com." A second terminal device 100 is also assigned a SIPURI as is the first terminal device 60.

The global IP+port 32 designates a set of a global IP address and a global port number. For example, the first terminal device 60 is assigned a set of a global IP address G1 and a global port number GP1. A set of a global IP address and a global port number is also called a "global address" in the following descriptions. Though described in detail later, the second terminal device 100 belongs to the same local network 50 as that to which the first terminal device 60 belongs. A global IP address G1 of the second terminal device 100 is therefore identical with the global IP address G1 of the first terminal device 60. A global port number GP2 of the second terminal device 100, however, differs from a global port number GP1 of the first terminal device 60. Meanwhile, a third terminal device 160 belongs to another local network 150 differing from the local network 50. A global IP address G2 of the third terminal device 160 therefor differs from the global IP address G1 of the first and second terminal devices 60 and 100. A global port number GP3 is assigned to the third terminal device 160.

A local IP+port 34 designates a set of a local IP address and a local port number. For example, the first terminal device 60 is assigned a set of a local IP address L1 and a global port number LP1. A set of a local IP address and a local port number is sometimes called a "local address" in the following descriptions. A local address is also assigned to each of the second terminal device 100 and the third terminal device 160. As contrasted with the global IP address, even when a plurality of terminal devices belong to a single local network, local IP addresses of the terminal devices differ from each other. A local IP address L1 of the first terminal device 60 therefore differs from a local IP address L2 of the second terminal device 100.

The public key 36 is utilized for decoding an encrypted response code to be described later. The terminal devices 60, 100, and 160 have mutually different public keys K1, K2, and K3, respectively. The flag 38 represents whether or not the terminal device has a function of establishing an RTP (Realtime Transport Protocol) communication session by use of a local address. The function is hereinbelow called a "local communication function." If the flag 38 is in an ON position, it means that the terminal device has a local communication function. In the embodiment, each of the terminal devices 60, 100, and 160 has a local communication function.

(Configuration of the STUN Server 40)

The STUN server 40 receives inquiry commands transmitted from the terminal devices in the local networks 50 and 150. The STUN server 40 analyzes the inquiry command, thereby obtaining a set (i.e., a global address) of a global IP address and a global port number of a source (e.g., the first terminal device 60) of the inquiry command. The STUN server 40 transmits the global address to the source of the inquiry command. The source of the inquiry command can thereby ascertain a global address assigned to the source itself.

(Configuration of the Local Network 50)

As shown in FIG. 1, the local network 50 is connected to the Internet 4 by way of a first NAT router 52. The first NAT router 52 is connected to the Internet 4 as well as to a LAN 54. The local network 50 is configured by terminal device(s) connected to the LAN 54. In the embodiment, the first terminal device 60 and the second terminal device 100 are connected to the LAN 54.

The first NAT router 52 performs address translation processing called NAT. The first NAT router 52 transmits data transmitted from the local network 50 to the Internet 4. In the data transmitted from the local network 50, a first set of a local IP address and a local port number is used as a source. On that occasion, the first NAT router 52 translates the first set, which is the source, into a second set of a global IP address and a global port number. Conversely, if data are transmitted from the Internet 4 while taking the second set as a destination, the first NAT router 52 translates the second set, which is a destination, into the first set.

(Configuration of the First Terminal Device 60)

Figure 3:
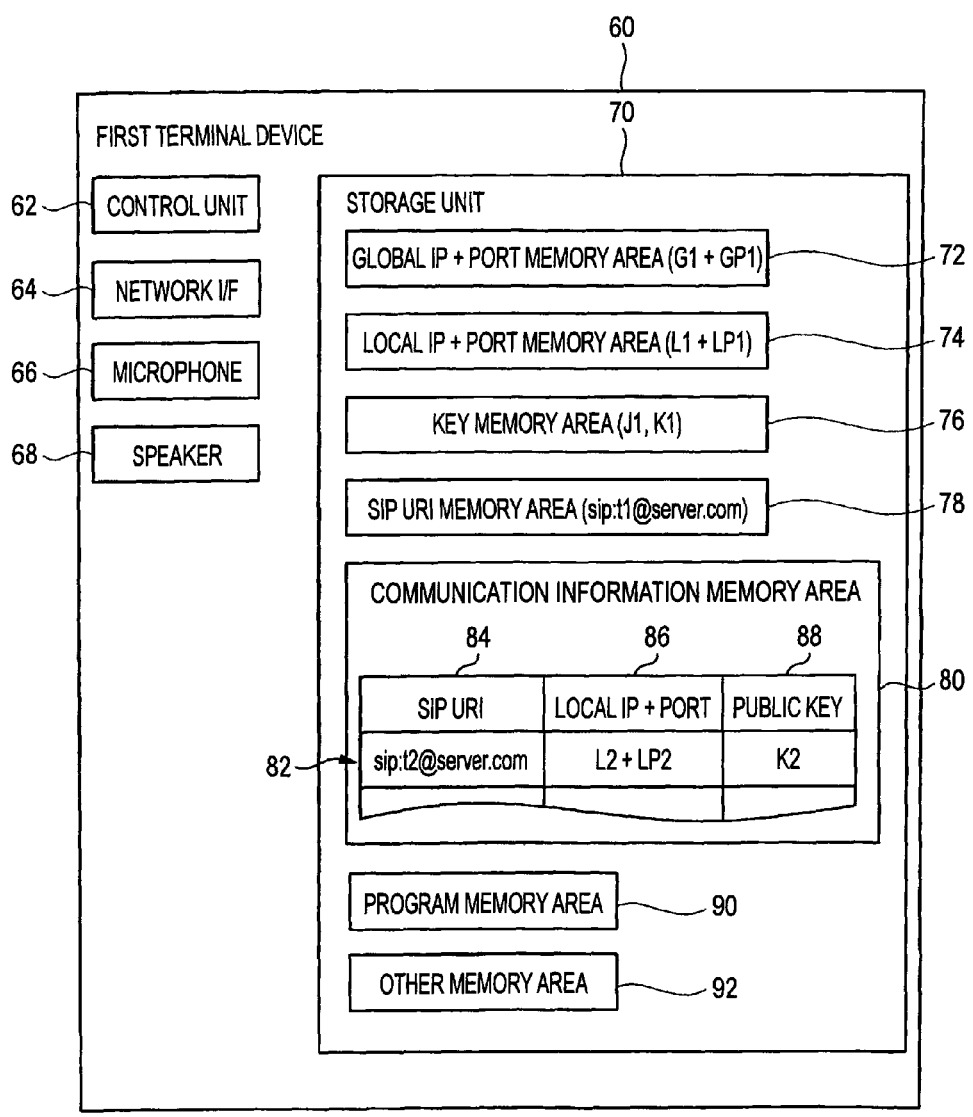
FIG. 3 shows a first terminal device according to the embodiment of the invention.

As shown in FIG. 3, the first terminal device 60 has a control unit 62, a network interface 64, a microphone 66, a speaker 68, a storage unit 70, and the like. Although not shown, a display unit, an operation unit, and the like, are also provided in the first terminal device 60. The control unit 62 performs processing in compliance with a program stored in the storage unit 70. The network interface 64 is connected to the LAN 54. The user of the first terminal device 60 can carry out a phone communication (an audio data communication) by utilization of the microphone 66 and the speaker 68.

The storage unit 70 includes a plurality of memory areas 72 to 92. The global IP+port memory area 72 stores a global address (G1+GP1) assigned to the first terminal device 60. A local IP+port memory area 74 stores a local address (L1+LP1) assigned to the first terminal device 60. A key memory area 76 stores a secret key J1 and a public key K1 of the first terminal device 60. A SIPURI memory area 78 stores a SIPURI (sip:t1@server.com) assigned to the first terminal device 60. A communication information memory area 80 stores communication information 82. The communication information 82 is information about communication parties on the other end to which a local communication function has been executed in the past. The communication information 82 corresponds to a set of a SIPURI 84, a global IP+port 86, and a public key 88. In an example shown in FIG. 3, the communication information 82 is information about the second terminal device 100. This means that the first terminal device 60 carried out a communication with the second terminal device 100 as a communication party on the other end in the past. The program memory area 90 stores a program to be executed by the control unit 62. The program memory area 90 may also store a program installed from a program storage medium or a program downloaded from the Internet 4 or the like. A memory area 92 stores information other than information to be stored in the memory areas 72 to 90. Specifics of the information to be stored in the memory area 92 are described later.

(Configuration of the Second Terminal Device 100)

Figure 4:
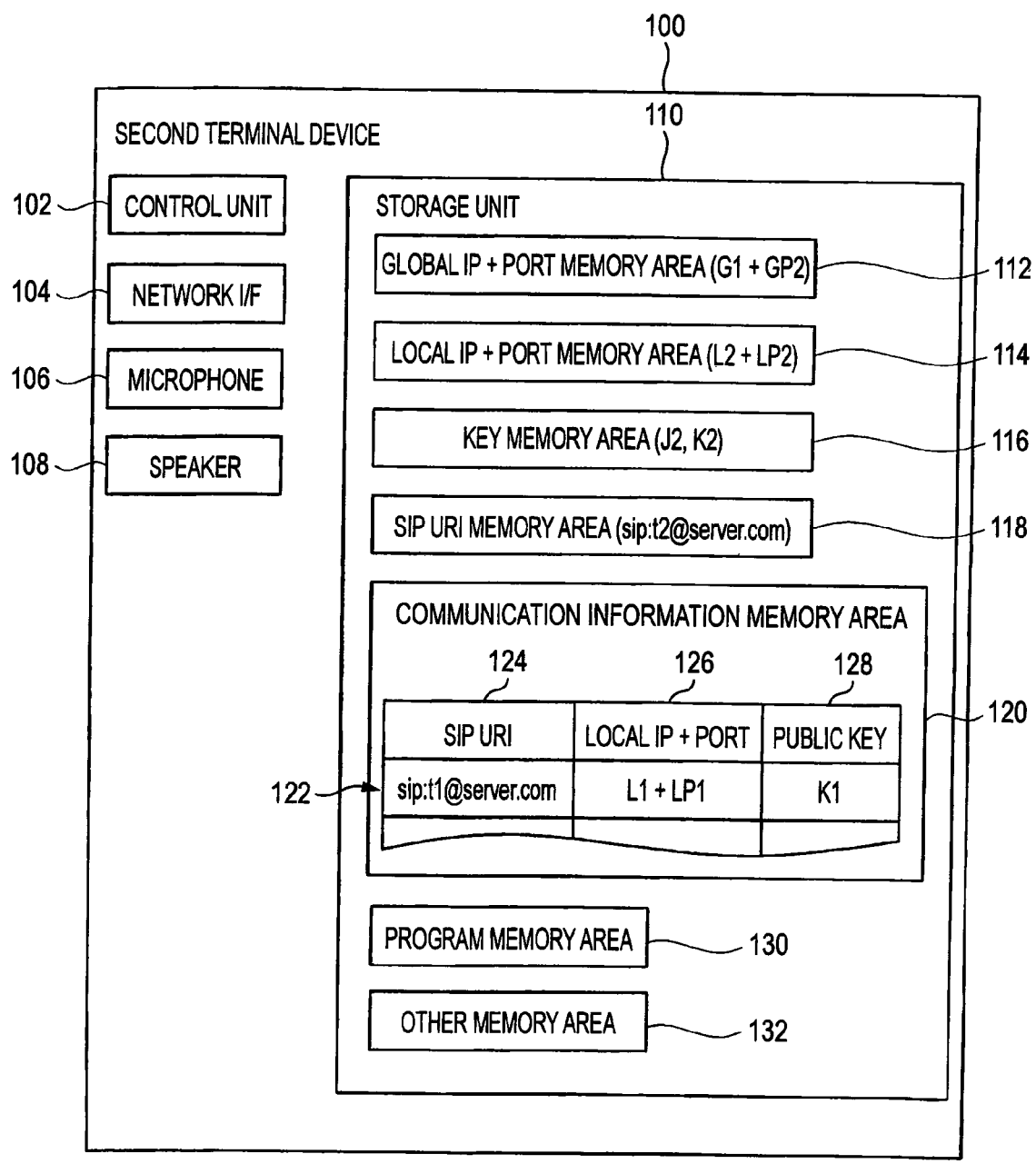
FIG. 4 shows a second terminal device according to the embodiment of the invention.

As shown in FIG. 4, the second terminal device 100 includes elements 102, 104, 106, 108, and 110 similar to the first terminal device 60. Memory areas 112, 114, 116, 118, 120, 122, 124, 126, 128, 130 and 132 of the storage unit 110 are also similar to the first terminal device 60. Information about the second terminal device 100 is stored in the respective memory areas 112, 114, 116, and 118. For example, reference symbol J2 of the key memory area 116 designates a secret key of the second terminal device 100. In the example shown in FIG. 4, communication information 122 belonging to a communication information memory area 120 corresponds to information 124, 126, and 128 about the first terminal device 60.

(Configuration of the Local Network 150)

As shown in FIG. 1, the local network 150 is connected to the Internet 4 by way of a second NAT router 152. The second NAT router 152 is connected to the Internet 4 as well as to a LAN 154. The local network 150 is made up of respective terminal devices connected to the LAN 154. In the present embodiment, the third terminal device 160 is connected to the LAN 154. The third terminal device 160 has a configuration similar to those of the first and second terminal devices 60 and 160.

(Brief Overview of Registration Processing)

Specifics of processing performed by the respective devices 10, 40, 60, and 100 are subsequently described. First, specifics of processing by means of which the first terminal device 60 registers information in the SIP server 10 are now described with reference to FIG. 5.

A memory area 92 (see FIG. 3) of the first terminal device 60 holds an address of the STUN server 40. The first terminal device 60 transmits an inquiry command 200 to, as a destination, an address of the STUN server 40. The inquiry command 200 includes the local address L1+LP1 of the first terminal device 60. The inquiry command 200 is transmitted to the STUN server 40 by way of a first NAT router 52 omitted from FIG. 5. The first NAT router 52 translates the local address L1+LP1 included in the inquiry command 200 into the global address G1+GP1.

The STUN server 40 receives the inquiry command 200. The STUN server 40 analyzes the inquiry command 200, thereby specifying the global address G1+GP1 included in the inquiry command 200. The STUN server 40 transmits a response 202 including the global address G1+GP1 to the first terminal device 60.

The first terminal device 60 receives the response 202. The first terminal device 60 stores the global address G1+GP1 included in the response 202 into the global IP+port memory area 72 (see FIG. 3) (i.e., updates data stored in the memory area 72). The memory area 92 of the first terminal device 60 holds the address of the SIP server 10. The first terminal device 60 transmits a REGISTER command 210 to, as a destination, the address of the SIP server 10. The REGISTER command 210 includes the SIPURI, the global address G1+GP1, the local address L1+LP1, the public key K1, and a flag 212 showing compatibility with a local communication function of the first terminal device 60.

Figure 2:
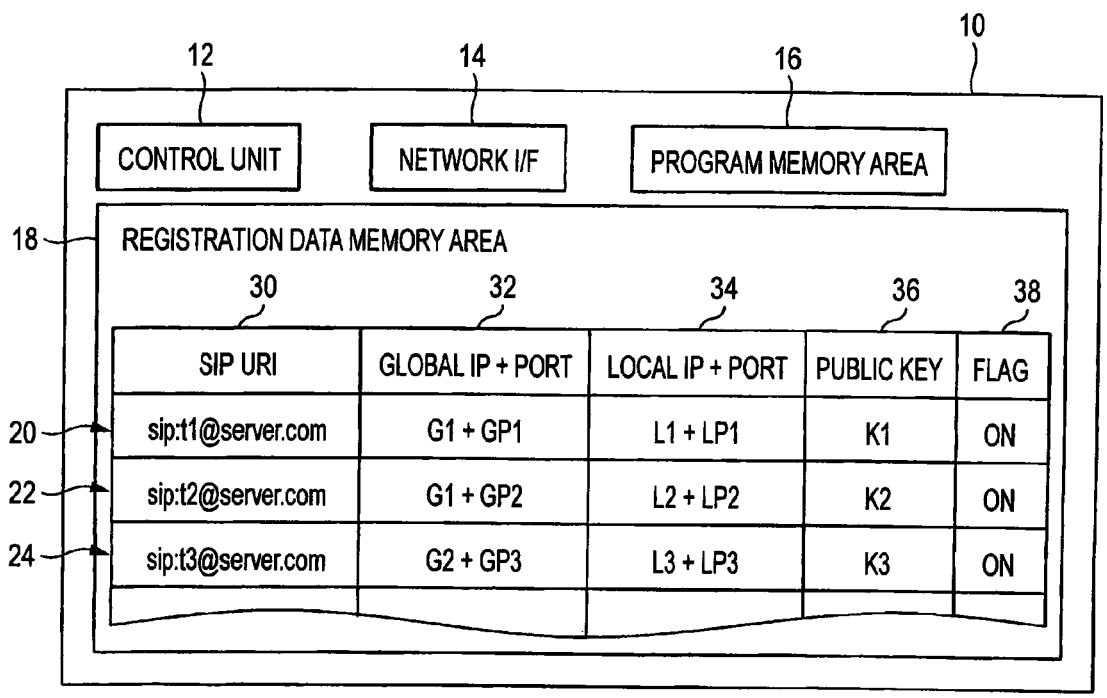
FIG. 2 shows an SIP server according to the embodiment of the invention.

The SIP server 10 receives the REGISTER command 210. The SIP server 10 transmits a "200 OK" signal 214 to the first terminal device 60. The SIP server 10 stores various sets of data included in the REGISTER command 210 into the registration data memory area 18 (see FIG. 2). The registration data 20 shown in FIG. 2 are thereby registered.

Figure 5:
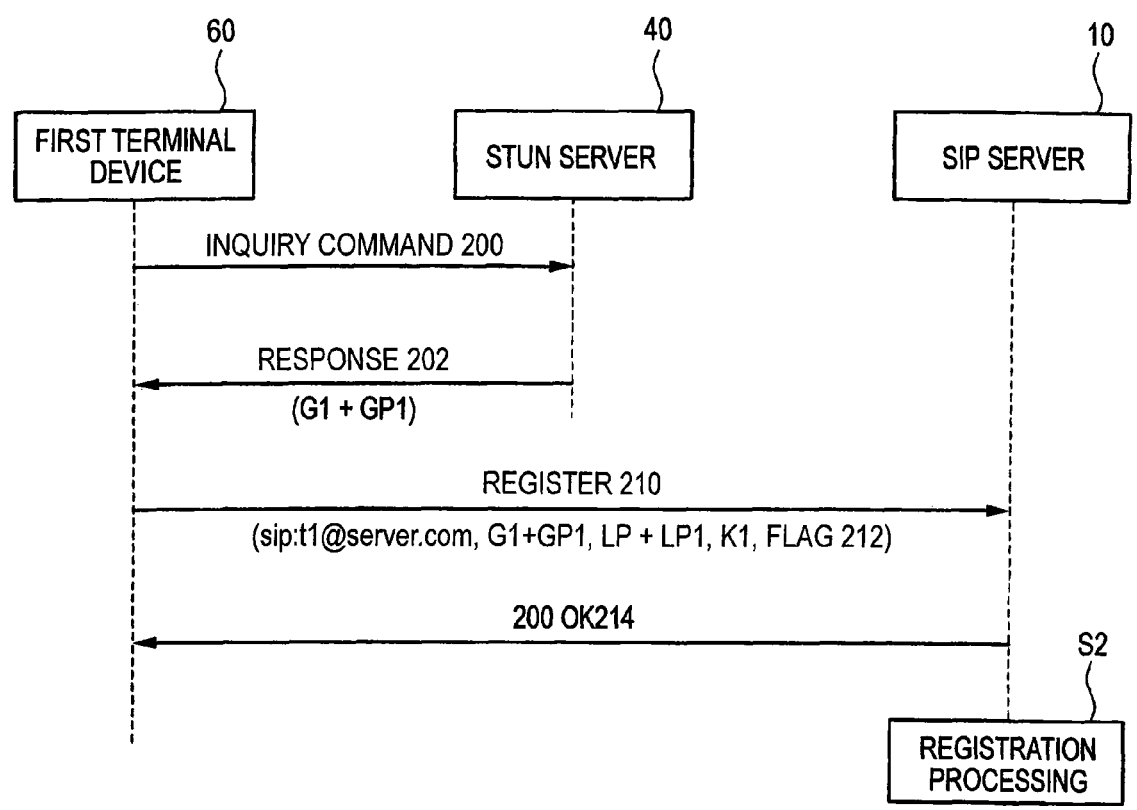
FIG. 5 shows a sequence chart of processing for registering information in an SIP server.

The first terminal device 60 periodically performs processing shown in FIG. 5. The first terminal device 60 can consequently obtain an up-to-date global address assigned to itself. The SIP server 10 can obtain up-to-date registration data 20 pertaining to the first terminal device 60. The second and third terminal devices 100 and 160 also periodically perform processing shown in FIG. 5 as does the first terminal device 60. The SIP server 10 can consequently obtain up-to-date registration data 22 and 24 pertaining to the second and third terminal devices 100 and 160, too.

(Brief Overview of INVITE Transmission Processing)

Processing by means of which the second terminal device 100 transmits an INVITE command to the first terminal device 60 is subsequently described with reference to FIG. 6. The user of the second terminal device 100 can enter the SIPURI of the first terminal device 60 by operating an operation unit (omitted from the drawings) of the second terminal device 100. The second terminal device 100 thereby initiates processing shown in FIG. 6.

A memory area 132 (see FIG. 4) of the second terminal device 100 holds an address of the SIP server 10. The second terminal device 100 transmits an INVITE command 220 to, as a destination, the address of the SIP server 10. The INVITE command 220 includes the SIPURI of the first terminal device 60 serving as the destination, the SPURI information about the second terminal device 100 serving as the source, the global address G1+GP2 of the second terminal device 100, and a flag 222 showing compatibility with the local communication function.

The SIP server 10 receives the INVITE command 220. The SIP server 10 identifies the global IP address G1 associated with a SIPURI of the destination (the SIPURI of the first terminal device 60) included in the INVITE command 220 by reference to the registration data memory area 18 (see FIG. 2). The SIP server 10 next performs determination processing for determining whether or not a match exists between the identified global IP address G1 and the global IP address G1 of the source included in the INVITE command 220 (S4). If a match exists between the two global IP addresses, the SIP server 10 identifies the local address L1+LP1 and the public key K1 associated with the SIPURI of the first terminal device 60 by reference to the registration data memory area 18 (see FIG. 2). The SIP server 10 transmits an identification response 224 including the thus-identified local address L1+LP1 and the identified public key K1 to the second terminal device 100. The identification response 224 also includes a flag 226 showing compatibility with the local communication function. Meanwhile, if no match exists between the two global IP addresses, the SIP server 10 transfers an INVITE command 228 to the first terminal device 60. The INVITE command 228 includes specifics analogous to those of the INVITE command 220.

The second terminal device 100 receives the identification response 224. The second terminal device 100 transmits an INVITE command 230 to, as a destination, the local address L1+LP1 of the first terminal device 60 included in the identification response 224. Since the INVITE command 230 is addressed to the local address L1+LP1, the command does not pass through the first NAT router 52. The INVITE command 230 includes the SIPURI of the second terminal device 100, the local address L2+LP2 of the second terminal device 100, the flag 232 showing that the INVITE command is compatible with the local communication function, and a challenge code 234.

The first terminal device 60 receives the INVITE command 230. The first terminal device 60 can thereby perceive arrival of an incoming call directed to the first terminal device. The first terminal device 60, for example, outputs predetermined sound or lets predetermined light illuminate. These operations are hereinbelow called call request notification. The user can realize origination of a phone call as a result of performance of call request notification. If the user performs call initiation operation (e.g., actuation of a hook key) in the middle of performance of call request notification, the first terminal device 60 performs response code generation processing (S6). The first terminal device 60 encrypts the challenge code 234 included in the INVITE command 230 by utilization of the secret key J1 (see the key memory area 76 shown in FIG. 3) of the first terminal device itself, thereby generating a response code 240. The first terminal device 60 next transmits a 200 OK command 236 to, as a destination, the local address L2+LP2 included in the INVITE command 230. Since the destination of the 200 OK command 236 is the local address L2+LP2, the command does not pass through the first NAT router 52. The 200 OK command 236 includes the response code 240 and a flag 238 showing that the 200 OK command is compatible with the local communication function.

The second terminal device 100 receives the 200 OK command 236. The second terminal device 100 decrypts the response code 240 included in the 200 OK command 236 by utilization of the public key K1 included in the identification response 224, thereby generating decrypted data. The second terminal device 100 performs determination processing for determining whether or not a match exists between the challenge code 234 and the decrypted data (S8). If a match exists between the two sets of data, the second terminal device 100 transmits an ACK command 242 to, as a destination, the local address L1+LP1. Since the designation of the ACK command 242 is the local address L1+LP1, the ACK command does not pass through the first NAT router 52. The ACK command 242 includes both a flag 244 showing that the ACK command is compatible with the local communication function and the public key K2 (see a key memory area 116 shown in FIG. 4) of the second terminal device 100.

The first terminal device 60 receives the ACK command 242. The first terminal device 60 performs storage processing for storing the SIPURI, the local address L2+LP2, communication information 82 (see FIG. 3) associated with the public key K2 of the second terminal device 100 in the communication information memory area 80 (S10). If the first terminal device 60 receives the ACK command 242, an RTP communication session is established between the first terminal device 60 and the second terminal device 100. By means of the thus-established RTP communication session, a data transmission is carried out while either the local address L1+LP1 or the local address L2+LP2 is taken as a source or a destination and while the remaining local address is taken as a remaining one of the source and the destination. Specifically, a data communication is performed without involvement of the first NAT router 52. The first terminal device 60 performs audio data communication processing (S12). Specifically, the first terminal device 60 outputs from a speaker 68 audio data received from the second terminal device 100, as well as transmitting audio data input by way of a microphone 66 to the second terminal device 100. The second terminal device 100 also carries out audio data communication processing in the same fashion (S14).

As a result of the RTP communication session being established, telephone communication between the first terminal device 60 and the second terminal device 100 can be carried out. FIG. 6 shows an example in which the second terminal device 100 transmits an INVITE command to the first terminal device 60. Even if the first terminal device 60 transmits the INVITE command to the second terminal device 100, there is established, as in the case of the embodiment shown in FIG. 6, an RTP communication session during which a data transmission is carried out while either the local address L1+LP1 or the local address L2+LP2 is taken as a source or a destination and while the remaining local address is taken as a remaining one of the source and the destination. If the second terminal device 100 (or the first terminal device 60) transmits the INVITE command to the third terminal device 160, the SIP server 10 makes a negative determination by means of determination processing of S4. The reason for this is that the third terminal device 160 is assigned the global IP address G2 differing from that of the second terminal device 100. In this case, there is established between the second terminal device 100 and the third terminal device 160 an RTP communication session during which a data transmission is carried out while either the global IP address G1+GP2 or the global IP address G2+GP3 is taken as a source or a destination and while the remaining global IP address is taken as a remaining one of the source and the destination.

There is subsequently described processing by means of which the first terminal device 60 transmits the INVITE command to the second terminal device 100 after disconnection of the RTP communication session established in FIG. 6 (i.e., after completion of a phone communication). FIG. 7 shows a sequence chart of processing. The user of the first terminal device 60 can input the SIPURI of the second terminal device 100 by actuation of the operation unit (omitted from the drawing) of the first terminal device 60. The first terminal device 60 thereby initiates processing shown in FIG. 7.

The first terminal device 60 determines whether or not the communication information 82 (see FIG. 3) including the SIPURI of the second terminal device 100 input by the user is stored in the communication information memory area 80. If an affirmative determination is rendered, the first terminal device 60 transmits an INVITE command 250 to, as a destination, the local address L2+LP2 included in the communication information 82. The INVITE command 250 does not pass through the first NAT router 52. The INVITE command 250 includes the SIPURI of the second terminal device 100, the local address L1+LP1 of the first terminal device 60, the flag 252 showing that the INVITE command is compatible with the local communication function, and the challenge code 254.

The second terminal device 100 receives the INVITE command 250. The second terminal device 100 performs call request notification (e.g., outputting of predetermined sound). If the user performs call initiation operation in the course of performance of call request notification, the second terminal device 100 performs response code generation processing (S16). The second terminal device 100 specifically encrypts the challenge code 254 included in the INVITE command 250 by utilization of the secret key J2 (see FIG. 4) of the second terminal device itself, thereby generating a response code 260. The second terminal device 100 then transmits a 200 OK command 256 to, as a destination, the local address L1+LP1 included in the INVITE command 250. The 200 OK command 256 does not pass through the first NAT router 52. The 200 OK command 256 includes a flag 258 showing that the 200 OK command 256 is compatible with the local communication function and the response code 260.

The first terminal device 60 receives the 200 OK command 256. The first terminal device 60 decrypts the response code 260 included in the 200 OK command 256 by utilization of the public key K2 included in the communication information 82, thereby generating decrypted data. The first terminal device 60 then performs determination processing for determining whether or not a match exists between the challenge code 254 and the decrypted data (S18). If a match exists between the two sets of data, the first terminal device 60 transmits an ACK command 262 to, as a destination, the local address L2+LP2. The ACK command 262 does not pass through the first NAT router 52. The ACK command 262 includes a flag 264 showing that the ACK command is compatible with the local communication function and the public key K1 of the first terminal device 60.

The second terminal device 100 receives the ACK command 262. The second terminal device 100 performs storage processing for storing, in a communication information memory area 120, the SIPURI, the local address L1+LP1, the communication information 122 (see FIG. 4) associated with the public key K1 of the first terminal device 60 (S20). The second terminal device 100 can also store the communication information 122 in the communication information memory area 120 after having transmitted the ACK command 242 in FIG. 6. Upon receipt of the ACK command 262, the second terminal device 100 establishes an RTP communication session between the first terminal device 60 and the second terminal device 100. Even in the RTP communication session, a data transmission is carried out while either the local address L1+LP1 or the local address L2+LP2 is taken as a source or a destination and while the remaining local address is taken as a remaining one of the source and the destination. Specifically, a data communication is carried out without involvement of the first NAT router 52. The first terminal device 60 and the second terminal device 100 perform audio data communication processing (S22 and S24).

Figure 8:
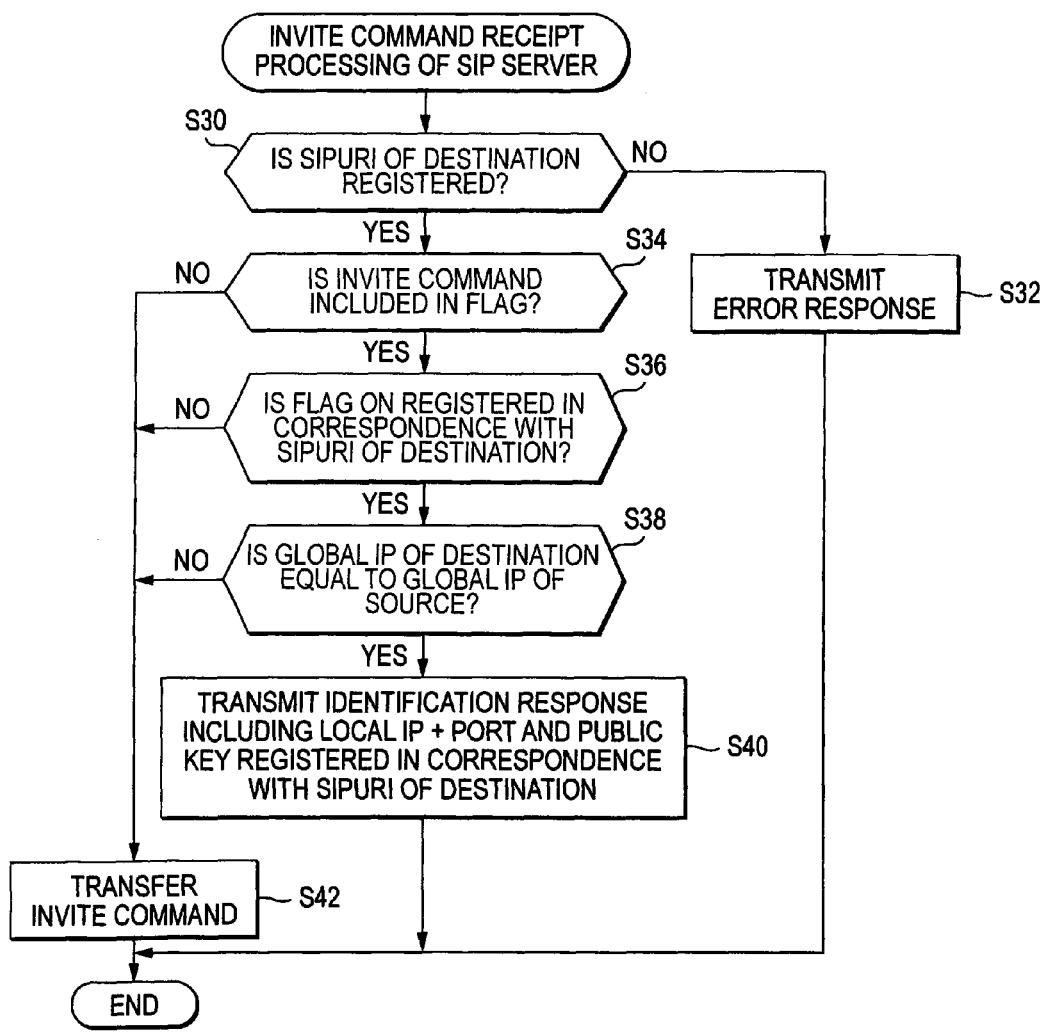
FIG. 8 shows a flowchart of INVITE receipt processing of the SIP server.

(INVITE Command Receipt Processing of the SIP Server) Processing performed by the control unit 12 (see FIG. 2) of the SIP server 10 is subsequently described in detail with reference to FIG. 8. Processing shown in FIG. 8 is performed by the control unit 12 and triggered by receipt of an INVITE command (e.g., the INVITE command 220 shown in FIG. 6).

Figure 6:
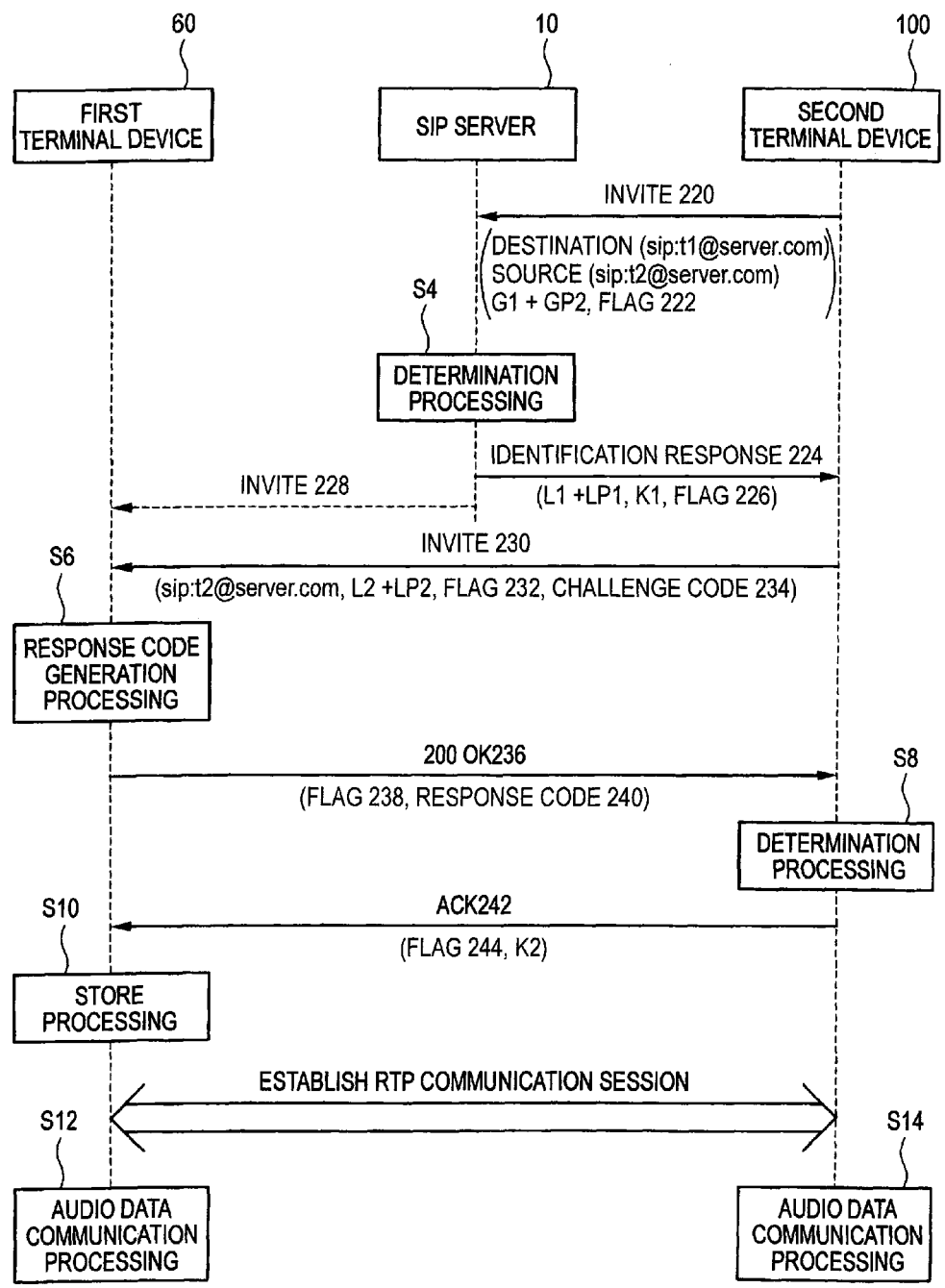
FIG. 6 shows a sequence chart of processing for carrying out communication by use of a local address.
Figure 7:
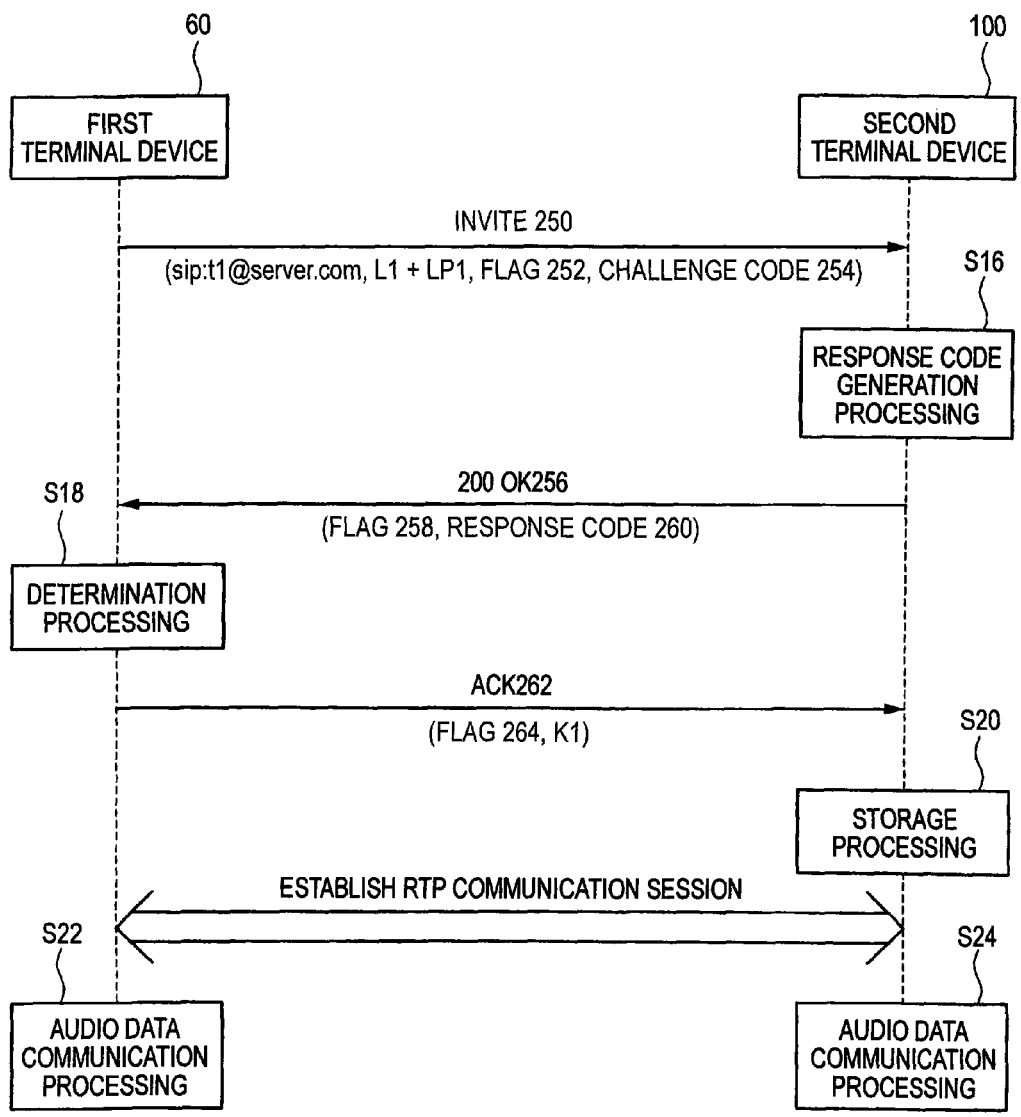
FIG. 7 shows a sequence chart of processing for again carrying out communication by use of the local address.

The control unit 12 determines whether or not the SIPURI of a destination included in the received INVITE command (e.g., "sip:t1@server.com" included in the INVITE command 220 shown in FIG. 6) is registered in the registration data memory area 18 (see FIG. 2) (S30). If NO is selected, the control unit 12 transmits an error response to the source of the received INVITE command (S32). In this case INVITE command receipt processing ends.

Meanwhile, if YES is selected in S30, the control unit 12 determines whether or not the received INVITE command includes a flag (e.g., the flag 222 shown in FIG. 6) showing that the INVITE command is compatible with the local communication function (S34). If NO is selected, processing proceeds to S42. On the contrary, if YES is selected, processing proceeds to S36. By reference to the registration data memory area 18, the control unit 12 determines, in S36, whether or not the flag 38 (see FIG. 2) associated with the SIPURI of the destination included in the received INVITE command is in an ON position. If NO is selected, processing proceeds to S42. If YES is selected, processing proceeds to S38.

In S38, the control unit 12 identifies a global IP address (e.g., G1) associated with the SIPURI of the destination included in the received INVITE command, by reference to the registration data memory area 18. The control unit 12 then determines whether or not a match exists between the thus-identified global IP address and the global address (e.g., G1 included in the INVITE command 220 in FIG. 6) of the source included in the received INVITE command. If NO is selected, processing proceeds to S42. On the contrary, if YES is selected, processing proceeds to S40.

In S40, the control unit 12 identifies a local address (e.g., L1+LP1) and the public key (e.g. K1) that are associated with the SIPURI of the destination included in the received INVITE command, by reference to the registration data memory area 18. The control unit 12 then transmits an identification response (e.g., the identification response 224 shown in FIG. 6) including the thus-identified local address and the public key to the source of the received INVITE command. INVITE receipt processing ends in this case.

In S42, the control unit 12 identifies a global IP address (e.g., G1+GP1) associated with the SIPURI of the destination included in the received INVITE command, by reference to the registration data memory area 18. The control unit 12 then transfers the INVITE command to, as a destination, the thus-identified global address. Although subsequent processing is omitted from FIG. 8, the control unit 12 transfers the 200 OK command to the source of the INVITE command if the 200 OK command that is an answer to the thus-transferred INVITE command is received. Further, if the ACK that is an answer to the thus-transferred 200 OK command is received, the control unit 12 transfers the ACK command to the destination of the INVITE command. The 200 OK command and the ACK command are transmitted (transferred) to, as a destination, the global address.

(INVITE Command Transmission Processing of the Terminal Device)

Figure 9:
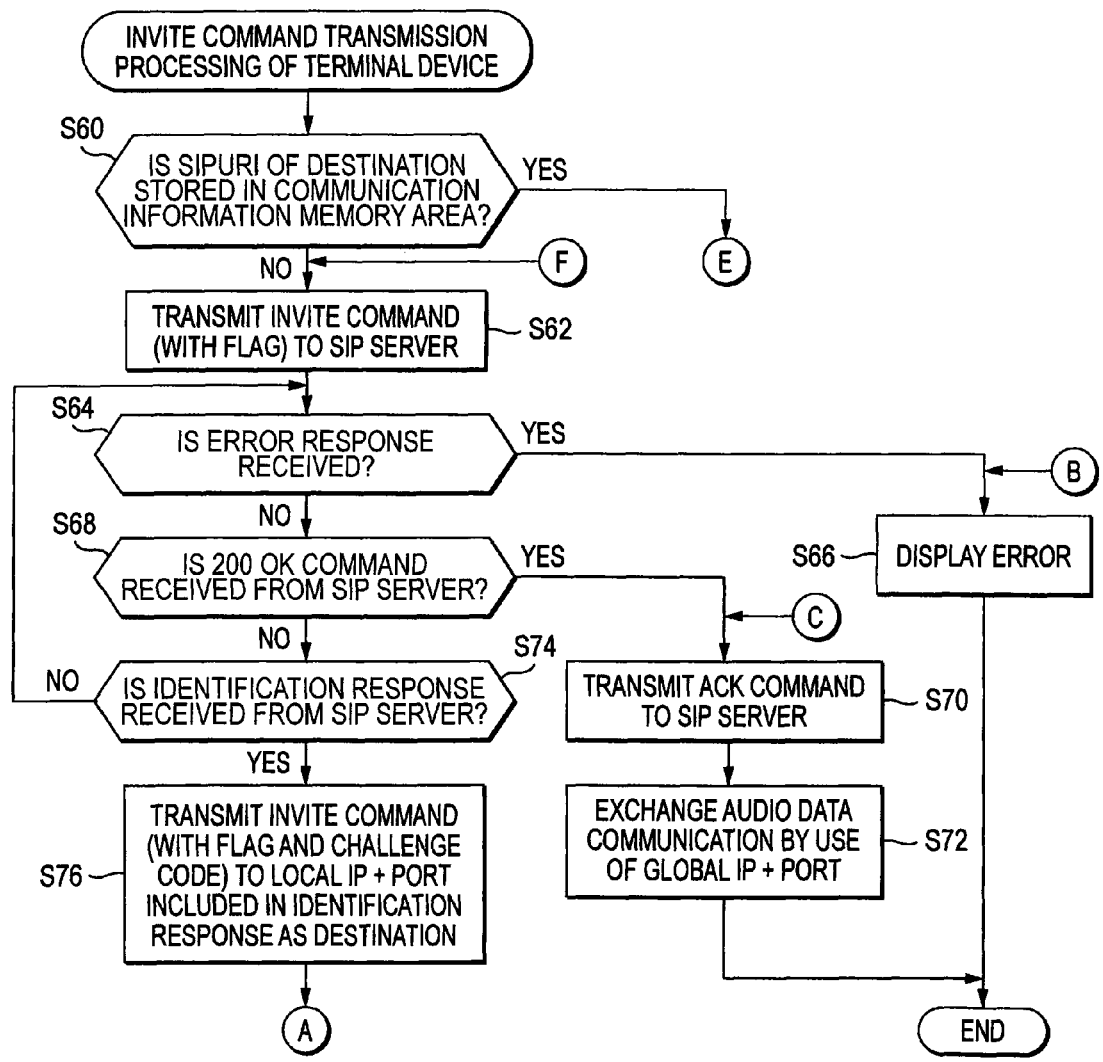
FIG. 9 shows a flowchart of INVITE transmission processing of the terminal device.
Figure 10:
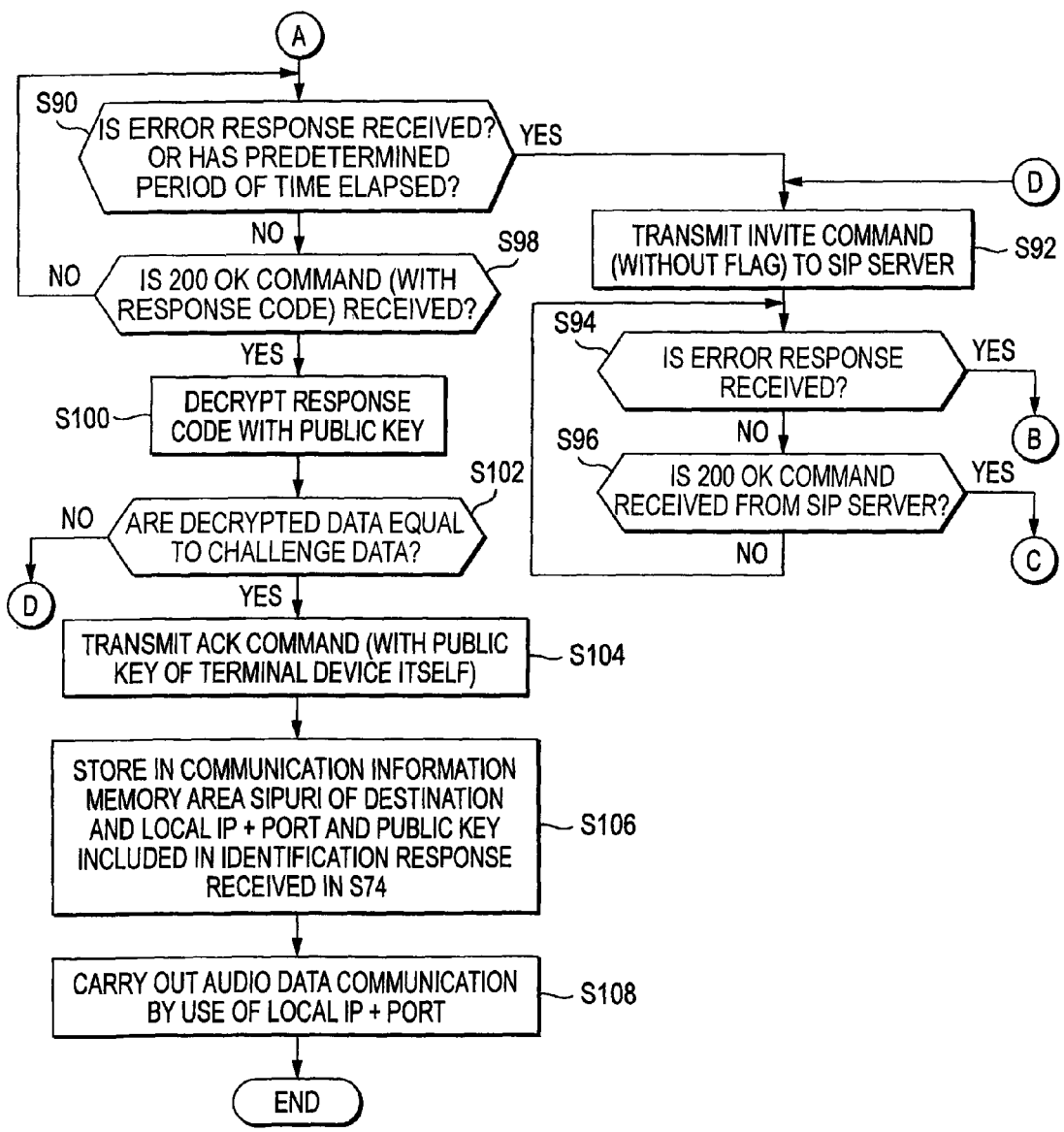
FIG. 10 shows a flowchart continued from FIG. 9.
Figure 11:
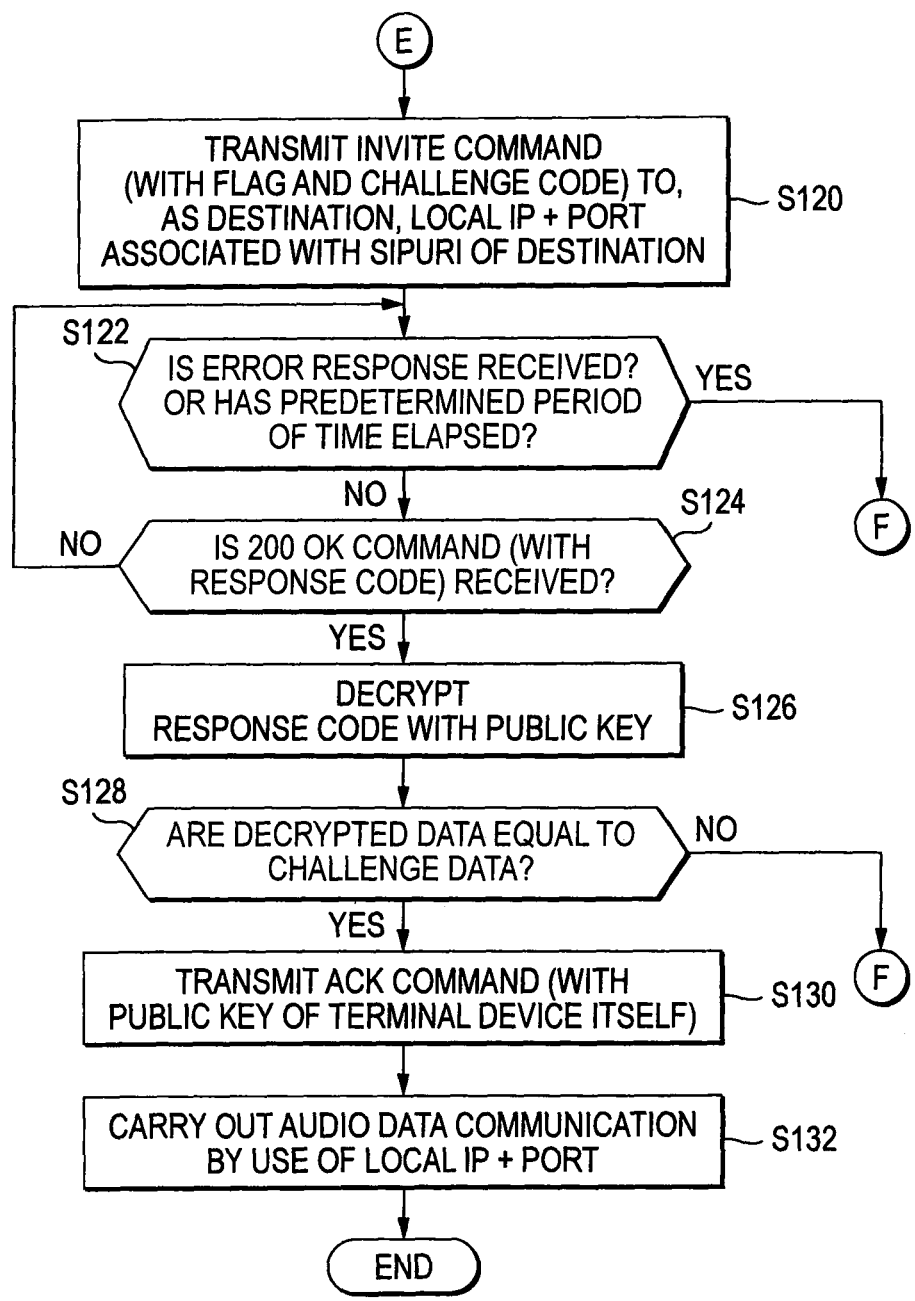
FIG. 11 shows a flowchart continued from FIG. 9.

Processing performed by the control unit 102 (see FIG. 4) of the second terminal device 100 is subsequently described in detail. The control unit 62 of the first terminal device 60 and a control unit (omitted from the drawing) of the third terminal device performs processing similar to that of the control unit 102 of the second terminal device 100. INVITE transmission processing performed by the control unit 102 is first described with reference to FIGS. 9 to 11. Processing shown in FIGS. 9 through 11 is triggered by entry of SIPURI of the destination of an INVITE command performed by the user.

The control unit 102 determines whether or not communication information including the SIPURI of a destination input by the user is stored in the communication information memory area 120 (see FIG. 4) (S60). If YES is selected, processing proceeds to S120 shown in FIG. 11. If NO is selected, processing proceeds to S62. In S62, the control unit 102 transmits to the SIP server 10 an INVITE command including a flag (see the flag 222 shown in FIG. 6) showing that the INVITE command is compatible with the local communication function.

The control unit 102 monitors receipt of an error response as an answer to the INVITE command transmitted in S62 (S64). If YES is selected, the control unit 102 lets an unillustrated display unit display an error (S66). In this case, INVITE command transmission processing ends.

The control unit 102 monitors receipt of the 200 OK command as an answer to the INVITE command transmitted in S62 (S68). If YES is selected, the control unit 102 transmits an ACK command to the SIP server 10 (S70). An RTP communication session is consequently established between the destination of the INVITE command and the second terminal device 100. As mentioned previously, commands (the INVITE command, the 200 OK command, and the ACK command) transmitted in order to establish an RTP communication session are transmitted by way of the SIP server 10. In this case, these commands are transmitted by use of the destination of the INVITE command and the global address of the second terminal device 100. There is consequently established an RTP communication session during which a data transmission is carried out while either the global address of the destination of the INVITE command or the global address of the second terminal device 100 is taken as a destination or a source and while the remaining one is taken as the source or the destination. The control unit 102 carries out an audio data transmission by utilization of the thus-established RTP communication session (S72). An audio data transmission is carried out by way of the first NAT router 52 in this case.

The control unit 102 monitors receipt of an identification response as an answer to the INVITE command transmitted in S62 (S74). If YES is selected, the control unit 102 randomly obtains a numerical value, thereby generating a challenge code. The control unit 102 then transmits an INVITE command to, as a destination, a local address included in the identification response (S76). The INVITE command includes the SIPURI, a flag (the flag 232 shown in FIG. 6) showing that the INVITE command is compatible with the local communication function, a challenge code, and the local address L2+LP2 of the second terminal device 100. After completion of processing pertaining to S76, processing proceeds to S90 shown in FIG. 10.

The control unit 102 monitors receipt of an error response as an answer to the INVITE command transmitted in S76 shown in FIG. 9 (S90). The control unit 102 also monitors, in S90, elapse of a predetermined period of time since the INVITE command was transmitted in S76. If YES is selected in S90, processing proceeds to S92.

The control unit 102 transmits to the SIP server 10 an INVITE command (including specifics analogous to those of the INVITE command transmitted in S62 shown in FIG. 9 except the flag) not including a flag showing that the INVITE command is compatible with the local communication function (S92). The control unit 102 monitors receipt of an error response as an answer to the INVITE command transmitted in S92 (S94). If YES is selected, the control unit 102 proceeds to S66 shown in FIG. 9 and lets the display unit indicate an error. The control unit 102 also monitors the 200 OK command being received as an answer to the INVITE command transmitted in S92 (S96). If YES is selected, the control unit 102 proceeds to S70 shown in FIG. 9 and transmits an ACK command to the SIP server 10.

The control unit 102 monitors receipt of the 200 OK command as an answer to the INVITE command transmitted in S76 shown in FIG. 9 (S98). If YES is selected, the control unit 102 decrypts the response code included in the 200 OK command received in S98 by utilization of the public key included in the identification response received in S74 shown in FIG. 9, thereby generating decrypted data (S100). The control unit 102 determines whether or not a match exists between the decrypted data and the challenge code transmitted in S76 shown in FIG. 9 (S102). If NO is selected, the control unit 102 proceeds to S92 where to transmit to the SIP server 10 an INVITE command not including a flag showing that the INVITE command is compatible with the local communication function.

Meanwhile, if YES is selected in S102, the control unit 102 transmits an ACK command including the public key K2 of the second terminal device 100 to, as a destination, a local address included in the identification response received in S74 shown in FIG. 9 (S104). The control unit 102 then stores in the communication information memory area 120 (see FIG. 4) the SIPURI of the destination input by the user, the local address included in the identification response received in S74 shown in FIG. 9, and communication information including the public key of the identification response itself (S106). As a result of the ACK command being transmitted in S104, an RTP communication session is established between the destination of the INVITE command and the second terminal device 100. If the INVITE command, the 200 OK command, and the ACK command are transmitted by use of the local address, there is consequently established an RTP communication session during which a data transmission is carried out while either the local address of the destination of the INVITE command or the local address of the second terminal device 100 is taken as a destination or a source and while the remaining one is taken as the source or the destination. The control unit 102 carries out an audio data transmission by utilization of the thus-established RTP communication session (S108). An audio data transmission is carried out without involvement of the first NAT router 52 in this case.

If YES is selected in S60 shown in FIG. 9 [if the SIPURI of the destination input by the user is stored in the communication information memory area 120 (see FIG. 4)] as mentioned previously, processing proceeds to S120 shown in FIG. 11. In S120, the control unit 102 identifies a local address associated with the SIPURI of the destination input by the user, by reference to the communication information memory area 120. The control unit 102 generates a challenge code. The control unit 102 then transmits an INVITE command to, as a destination, the thus-identified local address. The INVITE command includes the SIPURI, the flag showing compatibility with the local communication function, the challenge code, and the local address L2+LP2 of the second terminal device 100.

The control unit 102 monitors receipt of an error response as an answer to the INVITE command transmitted in S120 (S122). The control unit 102 also monitors, in S122, elapse of a predetermined period of time since the INVITE command was transmitted in S120. If YES is selected in S122, the control unit 102 proceeds to S62 shown in FIG. 9, where an INVITE command including a flag showing compatibility with the local communication function is transmitted to the SIP server 10.

The control unit 102 monitors receipt of the 200 OK command as an answer to the INVITE command transmitted in S120 (S124). If YES is selected, the control unit 102 decrypts the response code included in the 200 OK command received in S124 by utilization of the public key (e.g., K1) of the communication information including a SIPURI of the destination input by the user, thereby generating decrypted data (S126). The control unit 102 determines whether or not a match exists between the decrypted data and the challenge code transmitted in S120 (S128). If NO is selected, the control unit 102 proceeds to S62 shown in FIG. 9, where an INVITE command including a flag showing that the INVITE command is compatible with the local communication function is transmitted to the SIP server 10.

Meanwhile, if YES is selected in S128, the control unit 102 transmits an ACK command including the public key K2 of the second terminal device 100 to, as a destination, a local address (a local address associated with the SIPURI of the destination input by the user) identified in S120 (S130). An RTP communication session is established between the destination of the INVITE command and the second terminal device 100 as a result of transmission of the ACK command in S130. During the RTP communication session, a data communication is carried out while either the local address of the destination of the INVITE command or the local address of the second terminal device 100 is taken as either a destination or a source and while a remaining local address is taken as a remaining one of the source and the destination. The control unit 102 carries out an audio data transmission by utilization of the thus-established RTP communication session (S132). The audio data communication is carried out without involvement of the first NAT router 52 in this case.

(INVITE Command Receipt Processing of the Terminal Device)

Figure 12:
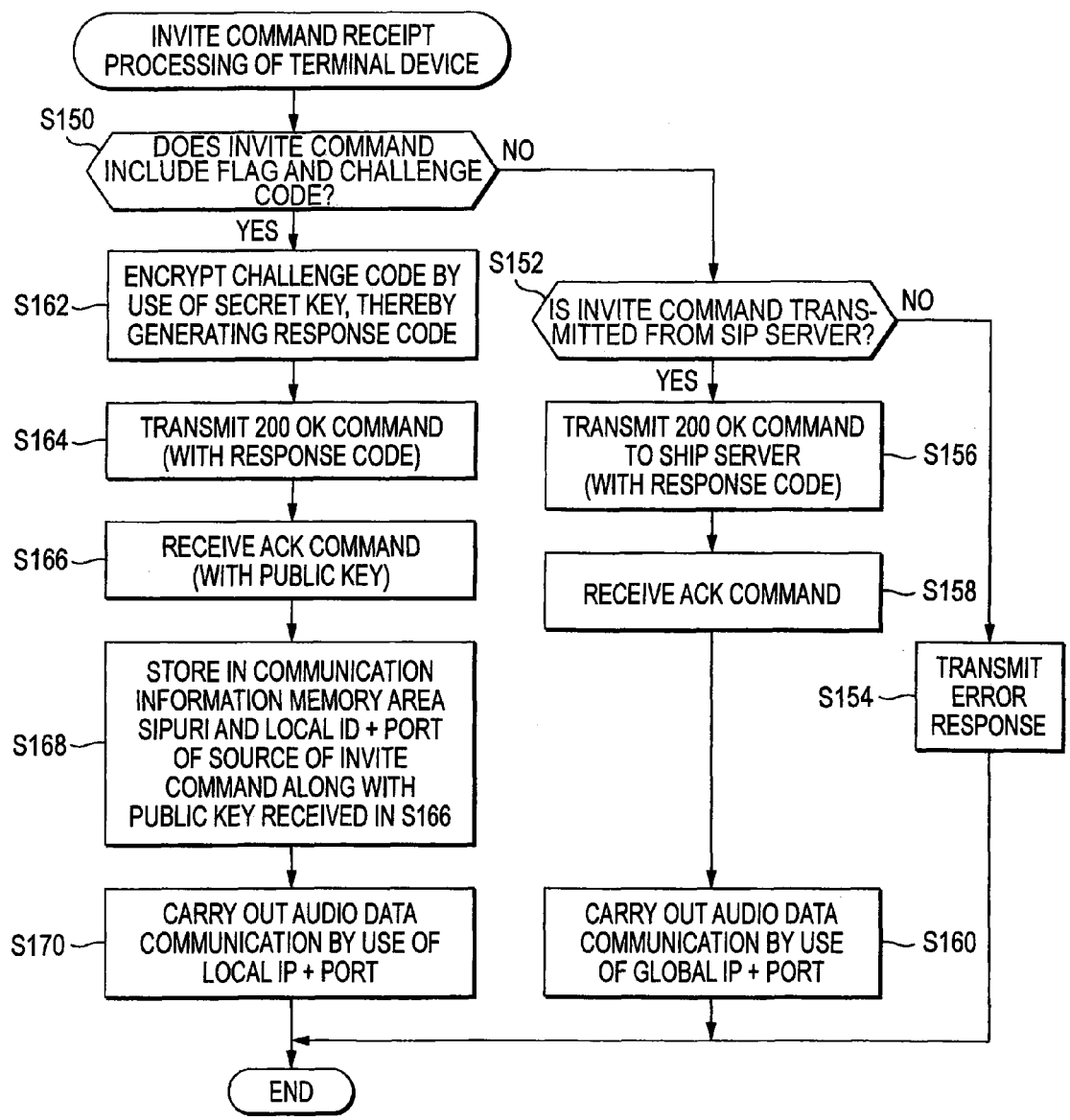
FIG. 12 shows a flowchart of INVITE receipt processing of the terminal.

INVITE command receipt processing performed by the control unit 102 of the second terminal device 100 is subsequently described with reference to FIG. 12. Processing shown in FIG. 12 is triggered by receipt of the INVITE command.

The control unit 102 determines whether or not the received INVITE command includes a flag showing that the INVITE command is compatible with the local communication function and the challenge code (S150). Specifically, as a result of; for example, the first terminal device 60 performing processing pertaining to S76 shown in FIG. 9 or S120 shown in FIG. 11, the control unit 102 determines whether or not the INVITE command transmitted to, as a destination, the local address L2+LP2 of the second terminal device is received. If YES is selected, processing proceeds to S162. On the contrary, if NO is selected, processing proceeds to S152.

The control unit 102 determines, in S152, whether or not the received INVITE command is transmitted by the SIP server 10. If NO is selected, the control unit 102 transmits an error response to the source of the received INVITE command (S154). INVITE command receipt processing ends in this case.

Though not illustrated in the flowchart, the control unit 102 performs communication request notification if YES is selected in S152. If the user has performed call initiation operation, the control unit 102 transmits the 200 OK command to the SIP server 10 (S156). The thus-transmitted 200 OK command is transferred to the source (e.g., the third terminal device 160) of the INVITE command by the SIP server 10. The source of the INVITE command transmits the ACK command to the SIP server 10 (see S70 shown in FIG. 9). The SIP server 10 transfers the thus-transmitted ACK command to the second terminal device 100. The second terminal device 100 receives the ACK command (S158). An RTP communication session is consequently established between the source of the INVITE command and the second terminal device 100. During the RTP communication session, a data communication is carried out while either the global address of the source of the INVITE command or the global address of the second terminal device 100 is taken as a destination or a source and while a remaining global address is taken as a remaining one of the source and the destination. The control unit 102 carries out an audio data communication by utilization of the thus-established RTP communication session (S160). The audio data communication is carried out by way of the first NAT router 52 in this case.

Though not illustrated in the flowchart, the control unit 102 performs communication request notification if YES is selected in S150. If the user has performed call initiation operation, the control unit 102 encrypts the challenge code included in the received INVITE command by utilization of the secret key J2 (see FIG. 4), thereby generating a response code (S162). The thus-received INVITE command includes a local address of the source (e.g., the first terminal device 60) of the INVITE command. The control unit 102 transmits the 200 OK command including the response code generated in S162 to, as a destination, the local address of the source of the INVITE command (S164). The source of the INVITE command consequently transmits the ACK command including the public key of the source itself to the second terminal device 100 (see S104 shown in FIG. 10 and S130 shown in FIG. 11). The second terminal device 100 receives the ACK command (S166).

The control unit 102 then stores in the communication information memory area 120 the SIPURI of the source (e.g., the first terminal device 60) of the INVITE command, the local address of the source of the INVITE command, and communication information associated with a public key included in the ACK command received in S166 (S168). If the ACK command is received in S166, an RTP communication session is established between the source of the INVITE command and the second terminal device 100. During the RTP communication session, a data communication is carried out while either the local address of the source of the INVITE command or the local address of the second terminal device 100 is taken as a destination or a source and while a remaining local address is taken as a remaining one of the source and the destination. The control unit 102 carries out an audio data communication by utilization of the thus-established RTP communication session (S170). The audio data communication is carried out without involvement of the first NAT router 52 in this case.

(Communication Information Management Processing of the Terminal Device)

Communication information management processing (a flowchart is omitted from the drawings) performed by the control unit 102 is subsequently described. The control unit 102 manages a time that has elapsed since the communication information was stored, in connection with respective pieces of communication information (e.g., communication information 122) stored in the communication information memory area 120. If there is communication information whose elapsed time has reached a predetermined time, the control unit 102 deletes the communication information from the communication information memory area 120. This makes it possible to prevent wasteful consumption of remaining memory space of the storage unit 110, which would otherwise be caused as a result of a plurality of pieces of communication information are continually stored in the communication information memory area 120.

The phone network system 2 of the present embodiment has been described in detail. According to the present embodiment, if a match exists between the global IP address G1 of the first terminal device 60 and the global IP address G1 of the second terminal device 100, the second terminal device 100 obtains the local address L1+LP1 and the public key K1 of the first terminal device 60 from the SIP server 10. In order to determine whether or not a communication can really be established with the first terminal device 60 if a communication is carried out by utilization of the thus-obtained local address L1+LP1, the second terminal device 100 performs challenge authentication by utilization of the obtained public key K1 (S102 in FIG. 10). If challenge authentication is successfully performed, the second terminal device 100 transmits the ACK command to the obtained local address L1+LP1 as a destination (S104 in FIG. 10). An RTP communication session is consequently established. During the thus-established RTP communication session, the first terminal device 60 and the second terminal device 100 can carry out an audio data transmission by use of their respective local addresses L1+LP1 and L2+LP2. An audio data communication can be carried out without involvement of the first NAT router 52. Processing load on the first NAT router 52 can thus be reduced. Further, a communication can be performed without involvement of the first NAT router 52; hence, there can be diminished a delay in communication established between the first terminal device 60 and the second terminal device 100 (put another word, a communication between terminals can be speeded up).

According to the present embodiment, if a match exists between the global IP address G1 of the first terminal device 60 and the global IP address G1 of the second terminal device 100, the SIP server 10 does not need to perform processing for transferring the 200 OK command the ACK command. Processing load on the SIP server 10 can also be reduced.

Even if no match exists between the global IP address of the first terminal device 60 and the second global IP address of the second terminal device 100, the SIP server 10 transfers the INVITE command transmitted from the second terminal device 100 to the first terminal device 60. The 200 OK command and the ACK command are exchanged between the first terminal device 60 and the second terminal device 100 by way of the SIP server 10 (S68 and S70 in FIG. 9). Even when challenge authentication has ended in failure, the INVITE command, the 200 OK command, and the ACK command are transmitted by way of the SIP server 10 (S92 and S96 shown in FIG. 10 and S70 shown in FIG. 9). An RTP communication session is consequently established. During the thus-established RTP communication session, the first terminal device 60 and the second terminal device 100 can exchange an audio data communication by use of their respective global addresses.

If conducted a communication by utilization of their respective local addresses L1+LP1 and L2+LP2, the first terminal device 60 and the second terminal device 100 store communication information 82 and 122 about their respective parties on the other ends (see FIGS. 3 and 4). The communication information 82 and 122 are continually reserved for a predetermined period of time. For example, if commanded by the user to again carry out a communication with the first terminal device 60, the second terminal device 100 can carry out a communication with the first terminal device 60 by utilization of the communication information 122 (by utilization of the local addresses L1+LP1). Likewise, if commanded by the user to again carry out a communication with the second terminal device 100, the first terminal device 60 can exchange a communication with the second terminal device 100 by utilization of the communication information 82 (by utilization of the local address L2+LP2). Processing load on the first NAT router 52 can further be reduced. In this case, the SIP server 10 does not need to perform processing because the communication does not involve the SIP server 10 at all (even the INVITE command is not transmitted to the SIP server).

If successfully performed challenge authentication, the second terminal device 100 transmits the ACK command including its public key K2 to the first terminal device 60 (S104 shown in FIG. 10). Therefore, if instructed by the user to again carry out a communication with the second terminal device 100, the first terminal device 60 can perform challenge authentication by utilization of the public key K2.

As can be seen from the foregoing, the first terminal device 60, the second terminal device 100, and the SIP server 10 of the present embodiment correspond to the first terminal device, the second terminal device, and the connection management server, respectively. Processing for receiving an identification response performed in S74 shown in FIG. 9 corresponds to processing performed by the local address obtaining unit. Processing for monitoring receipt of a response performed in S90 and S98 shown in FIG. 10 and S120 and S124 shown in FIG. 11, processing for decrypting a response code in S100 shown in FIG. 10 and S126 shown in FIG. 11, and processing for comparing decrypted data with challenge data pertaining to S102 shown in FIG. 10 and S128 shown in FIG. 11 correspond to processing performed by the determination unit. Processing for carrying out an audio data communication by use of a local address performed in S108 shown in FIG. 10 corresponds to processing for communicating the first data by use of the first local IP address performed by the target data communication unit (the first target data communication unit).

Processing for receiving the 200 OK command from the SIP server 10 performed in S96 shown in FIG. 10 corresponds to processing performed by the global address obtaining unit. Processing for carrying out an audio data communication by use of a global address performed in S72 shown in FIG. 9 corresponds to processing for communicating the second data by use of the first global IP address performed by the target data communication unit (the second target data communication unit). Processing for transmitting a challenge code in S76 shown in FIG. 9 and receiving a 200 OK command in S98 shown in FIG. 10 also corresponds to processing performed by the first challenge data communication unit. Processing for storing communication information in S106 shown in FIG. 10 corresponds to processing performed by the storage control unit. Processing for carrying out an audio data communication by use of a local address performed in S132 shown in FIG. 10 corresponds to processing for communicating the third data by use of the first local IP address again performed by the target data communication unit.

Processing for transmitting an ACK command including a public key performed in S104 shown in FIG. 10 corresponds to processing performed by the public key transmission unit. Processing for receiving a challenge code in S150 shown in FIG. 12, processing for generating a response code in S162, and processing for transmitting a response code in S164 correspond to processing performed by the second challenge data communication unit. Processing for carrying out an audio data communication by use of a local address in S170 shown in FIG. 12 corresponds to processing for performing the fourth data by use of a second local IP address performed by the target data communication unit. The control unit 12 shown in FIG. 2 also corresponds to the server-side storage control unit, the server-side determination unit, the server-side transmission unit, and the server-side transfer unit, and the registration data storage unit 18 corresponds to the server-side storage unit.

Although the specific embodiment of the present invention has been described in detail thus far, the embodiment is a mere illustration and does not limit the scope of claims. The technique described in the claims encompasses various modifications and alterations of the specific embodiment mentioned above. Exemplified modifications of the embodiment are provided below.

(1) The technique described in connection with the embodiment can also be applied to a communication system other than the phone communication. For example, the technique may be applied to a FAX data communication system and a communication system of video data and audio data.

(2) The SIP server 10 and the STUN server 40 may be assembled into a single unit. Further, other two or more devices (e.g., the first NAT router 52 and the STUN server 40) described in connection with the embodiment may also be assembled into a single unit.

(3) In the embodiment, if the second terminal device 100 transmits an INVITE command to the third terminal device 160, the SIP server 10 determines that no match exists between the global IP address G1 of the second terminal device 100 and the global IP address G2 of the third terminal device 160. In this case, the SIP server 10 transfers an INVITE command. The 200 OK command and the ACK command are also transmitted by way of the SIP server 10. In place of this mode, the SIP server 10 can also transmit the global address G2+GP3 of the third terminal device 160 to the second terminal device 100. The second terminal device 100 can also transmit the INVITE command to, as a destination, the global address G2+GP3 of the third terminal device 160. Specifically, the second terminal device 100 can also transmit the INVITE command to the third terminal device 160 without involvement of the SIP server 10. In this case, the 200 OK command and the ACK command can also be transmitted without involvement of the SIP server 10. The present modification makes it possible to reduce processing load on the SIP server 10.

(4) In the above embodiment, the terminal devices 60, 100 and 160 send the STUN server 40 inquiries about their own global addresses. However, the terminal devices 60, 100 and 160 may send the NAT routers 52 and 152 inquiries about their own global addresses by utilization of an UPnP.

Technical elements described in connection with the specification and the drawings shall exhibit technical usefulness solely or in combination and are not limited to the combinations described in connection with the claims as filed. The techniques exemplified in connection with the specification or the drawings shall concurrently attain a plurality of objects, and attainment of one of the objects results in exhibition of the technical usefulness.

What is claimed is:

1. A connection management server used in a system that comprises the connection management server, a first terminal device and a second terminal device, said connection management server comprising:

a control unit;

a memory having a program stored thereon that, when executed by the control unit, causes the connection management server to:

hold a first global IP address, a first local IP address, and first authentication information of the first terminal device in association with one another in a server-side storage unit;

receive a connection request that is transmitted by the second terminal device to the first terminal device as a destination and that includes a second global IP address of the second terminal device;

determine whether the first global IP address of the first terminal device held in the server-side storage unit matches the second global IP address of the second terminal device included in the connection request; and transmit the first local IP address and the first authentication information of the first terminal device held in the server-side storage unit to the second terminal device if the control unit determines that the first global IP address matches the second global IP address.

2. The connection management server according to claim 1, wherein the program, when executed by the control unit, further causes the connection management server to transfer the connection request to the first terminal device, when determining that the first global IP address does not match the second global IP address.

3. A non-transitory computer readable medium having a computer program for a second terminal device used in a system that comprises a connection management server, a first terminal device, and the second terminal device, said computer program being stored on the computer readable medium, readable by a computer, and causing, when executed by the computer, the computer to perform operations comprising:

obtaining a first local IP address and first authentication information of the first terminal device from the connection management server in which the first local IP address and the first authentication information are registered, if a first global IP address of the first terminal device matches a second global IP address of the second terminal device;

determining, by using the obtained first authentication information, whether a first particular terminal device with which the second terminal device can communicate by use of the first local IP address is the first terminal device; and communicating first data with the first terminal device by use of the first local IP address, if the first particular terminal device is determined to be the first terminal device.

4. A second terminal device used in a system that comprises a connection management server, a first terminal device, and the second terminal device, said second terminal device comprising:

a control unit;

a memory having a program stored thereon that, when executed by the control unit, performs operations comprising:

obtaining a first local IP address and first authentication information of the first terminal device from the connection management server in which the first local IP address and the first authentication information are registered, if a first global IP address of the first terminal device matches a second global IP address of the second terminal device;

determining, by using the obtained first authentication information, whether a first particular terminal device with which the second terminal device can communicate by use of the first local IP address is the first terminal device; and communicating first data with the first terminal device by use of the first local IP address, if the first particular terminal device is determined to be the first terminal device.

5. The second terminal device according to claim 4, wherein the program, when executed by the control unit, further performs operations comprising:

obtaining a set of the first global IP address and a port number of the first terminal device, wherein if the first particular terminal device is determined not to be the first terminal device, second data is communicated with the first terminal device by use of the set of the first global IP address and the port number.

6. The second terminal device according to claim 4, wherein the program, when executed by the control unit, further performs operations comprising:

transmitting first challenge data to the first particular terminal device; and receiving first response data transmitted by the first particular terminal device in response to the first challenge data, the first response data being generated by encrypting the first challenge data, wherein the first authentication information includes a first public key of the first terminal device, and wherein the determining operation includes decrypting the first response data using the first public key so as to generate first decrypted data, and if the first decrypted data matches the first challenge data, the determining operation determining that the particular first terminal device is the first terminal device.

7. The second terminal device according to claim 6, wherein if the first response data are not received in the receiving operation, the determining operation determining that the particular first terminal device is not the first terminal device.

8. The second terminal device according to claim 4, further comprising:

a storage control unit configured to hold the first local IP address in a storage unit, wherein when second data are to be communicated with the first terminal device after completion of the communication of the first data, the communicating operation communicates the second data with the first terminal device by using again the first local IP address held in the storage unit.

9. The second terminal device according to claim 8, wherein the storage control unit further holds the first authentication information in the storage unit, wherein when the second data are to be communicated with the first terminal device after the completion of the communication of the first data, the determining operation determines, by use of the first authentication information held in the storage unit, whether a particular second terminal device with which the second terminal device can communicate by use of the first local IP address held in the storage unit is the first terminal device, and wherein if the determining operation determines that the particular second terminal device is the first terminal device, the communicating operation communicates the second data with the first terminal device by using again the first local IP address held in the storage unit.

10. The second terminal device according to claim 4, wherein the program, when executed by the control unit, further performs operations comprising:

transmitting a second public key of the second terminal device to the first terminal device if the determining operation determines that the particular first terminal device is the first terminal device; and receiving second challenge data that is transmitted by the first terminal device to the second local IP address of the second terminal device as a destination;

encrypting the second challenge data using a secret key of the second terminal device so as to generate second response data; and transmitting the second response data to the first terminal device, wherein if second decrypted data matches the second challenge data, the communicating operation communicates second data with the first terminal device by use of the second local IP address, wherein the second decrypted data is generated by the first terminal device by decrypting the second response data by use of the second public key.

11. A system comprising:

a connection management server;

a first terminal device; and the second terminal device according to claim 4.

* * * * *